(12) United States Patent
Ribeiro et al.

(10) Patent No.: US 8,737,321 B2
(45) Date of Patent: May 27, 2014

(54) CHANNEL RESERVATION IN TIME DIVISION DUPLEX WIRELESS COMMUNICATION SYSTEM

(75) Inventors: Cássio Barboza Ribeiro, Espoo (FI); Jarkko Kneckt, Espoo (FI); Michal Čierny, Helsinki (FI)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 12/765,271

(22) Filed: Apr. 22, 2010

(65) Prior Publication Data
US 2011/0261728 A1 Oct. 27, 2011

(51) Int. Cl.
*H04W 4/00* (2009.01)
*H04W 72/00* (2009.01)

(52) U.S. Cl.
USPC .......................... 370/329; 370/348; 455/450

(58) Field of Classification Search
None
See application file for complete search history.

(56) References Cited

U.S. PATENT DOCUMENTS

| | | | |
|---|---|---|---|
| 2004/0146072 A1 | 7/2004 | Farmwald | |
| 2005/0135295 A1* | 6/2005 | Walton et al. | 370/328 |
| 2005/0169232 A1* | 8/2005 | Sakoda et al. | 370/347 |
| 2006/0114867 A1* | 6/2006 | Du et al. | 370/338 |
| 2007/0217443 A1* | 9/2007 | Sakoda et al. | 370/463 |
| 2008/0004076 A1* | 1/2008 | Adachi et al. | 455/560 |
| 2009/0028108 A1* | 1/2009 | Sherman | 370/329 |
| 2009/0059891 A1 | 3/2009 | Sakoda et al. | |
| 2009/0245405 A1* | 10/2009 | Sadowsky et al. | 370/294 |
| 2010/0220690 A1* | 9/2010 | Majkowski et al. | 370/336 |
| 2010/0329131 A1* | 12/2010 | Oyman et al. | 370/252 |
| 2011/0222408 A1* | 9/2011 | Kasslin et al. | 370/241 |

FOREIGN PATENT DOCUMENTS

WO 2009/154406 A2 12/2009

OTHER PUBLICATIONS

Jeongkyun Yun and Saewoong Bahk, "Parallel Contention Algorithm with CSMA/CA for OFDM Based High Speed Wireless LANs," The 14th IEEE 2003 International Symposium on Personal, Indoor and Mobile Radio Communication Proceedings, IEEE, 2003, pp. 2581-2585.
Joao Luis Sobrinho, et al., "Why RTS-CTS is not your ideal wireless LAN multiple access protocol," IEEE Communications Society / WCNC 2005, IEEE, 2005, pp. 81-87.
Xianchang Li, et al., "An Improved Long Transmission Protocol for VDL Mode 4," IEEE, 2006, pp. 1-4.
Stavros Toumpis and Andrea J. Goldsmith, "New Media Access Protocols for Wireless Ad Hoc Networks Based on Cross-Layer Principles," IEEE Transactions on Wireless Communications, IEEE, vol. 5, No. 8, Aug. 2006, pp. 2228-2241.

(Continued)

*Primary Examiner* — Gregory Sefcheck
*Assistant Examiner* — Joshua Smith
(74) *Attorney, Agent, or Firm* — Squire Sanders (US) LLP

(57) ABSTRACT

Channel reservation in time division duplex for devices in systems involving, for example user devices and access points, may be accomplished using channel reservation request messages, such as request-to-send (RTS) messages and channel reservation grant messages, such as clear-to-send (CTS) messages. A method for channel reservation may include preparing a frame including at least one channel reservation request message and at least one channel reservation grant message. The preparing may include multiplexing the at least one channel reservation request message and the at least one channel reservation grant message at least by frequency-division multiplexing. The method may also include transmitting the frame from a first node to a second node, wherein the channel reservation request message and the channel reservation grant message relate to communications between the first node and the second node.

16 Claims, 13 Drawing Sheets

Arrangement for RTS-CTS with minimum number of direction switches and short DL allocation delay

(56) References Cited

OTHER PUBLICATIONS

Murad Abusubaih, et al., "Collaborative Setting of RTS/CTS in Multi-Rate Multi-BSS IEEE 802.11 Wireless LANs," Proceedings of the 16th IEEE Workshop on Local an Metropolitan Area Networks (IEEE Lanman) Sep. 2008, Cluj-Napoca, Romania, pp. 1-6.
International Search Report application No. PCT/IB2011/051778 dated Jul. 21, 2011.

* cited by examiner

Figure 1: Reference frame structures for scheduled access.

Figure 2: Reference frame structures for RTS-CTS based access.

Figure 3: Arrangement for RTS-CTS with minimum number of direction switches and short DL allocation delay Figure 4: Arrangement for RTS-CTS with minimum number of direction switches and flexible DL-to-UL switching point.

Figure 5: Arrangement for RTS-CTS with minimum number of direction switches and reservations in UL only.

Figure 6: Arrangement of RTS-CTS messages with minimum allocation delay. All allocation delays are smaller than one frame.

Figure 7: Arrangement of RTS-CTS messages with measurement opportunities in every possible direction change.

Figure 8: Compression possibilities for RTS-CTS messages: (a) multiplexing in frequency, (b) multiplexing in frequency and time, with room for detailed CTS responses, and (c) combined CTS and RTS for devices with traffic in both directions.

CHANNEL RESERVATION IN TIME DIVISION DUPLEX WIRELESS COMMUNICATION SYSTEM

BACKGROUND

1. Field

Channel reservation in time division duplex for devices in systems involving, for example user devices and access points, may be accomplished using channel reservation request messages, such as request-to-send (RTS) messages, and channel reservation grant messages, such as clear-to-send (CTS) messages. The format of such messages within a time division duplex (TDD) frame may be significant in, for example, the physical (PHY) layer of local area evolution (LAE).

2. Description of the Related Art

Various frame structures exist for request-to-send (RTS) and clear-to-send (CTS) messages. The frame structures, however, are not applicable to transmissions of orthogonal frequency division multiple access (OFDMA) systems.

SUMMARY

In certain embodiments, the present invention is a method. The method includes preparing a frame including at least one channel reservation request message and at least one channel reservation grant message. The preparing includes multiplexing the at least one channel reservation request message and the at least one channel reservation grant message at least by frequency-division multiplexing. The method also includes transmitting the frame from a first node to a second node. The channel reservation request message and the channel reservation grant message relate to communications between the first node and the second node.

In another embodiment a method includes preparing a frame including at least one channel reservation request message and no channel reservation grant messages or no channel reservation request messages and at least one channel reservation grant message. The method also includes transmitting the frame from a first node to a second node, wherein the channel reservation request message and the channel reservation grant message relate to communications between the first node and the second node.

Another embodiment of the present invention is an apparatus. The apparatus includes at least one memory including computer program code and at least one processor. The at least one memory and computer program code are configured to, with the at least one processor, cause the apparatus at least to prepare a frame including at least one channel reservation request message and at least one channel reservation grant message. The preparation of the frame includes multiplexing the at least one channel reservation request message and the at least one channel reservation grant message at least by frequency-division multiplexing. The at least one memory and computer program code are also configured to, with the at least one processor, cause the apparatus at least to transmit the frame from a first node to a second node. The channel reservation request message and the channel reservation grant message relate to communications between the first node and the second node.

An apparatus, in another embodiment of the present invention, includes at least one memory including computer program code and at least one processor. The at least one memory and computer program code are configured to, with the at least one processor, cause the apparatus at least to prepare a frame including at least one channel reservation request message and no channel reservation grant messages or no channel reservation request messages and at least one channel reservation grant message. The at least one memory and computer program code are also configured to, with the at least one processor, cause the apparatus at least to transmit the frame from a first node to a second node, wherein the channel reservation request message and the channel reservation grant message relate to communications between the first node and the second node.

In certain embodiments, the present invention is an apparatus. The apparatus includes preparing means for preparing a frame including at least one channel reservation request message and at least one channel reservation grant message. The preparing means includes multiplexing means for multiplexing the at least one channel reservation request message and the at least one channel reservation grant message at least by frequency-division multiplexing. The apparatus also includes transmitting means for transmitting the frame from a first node to a second node. The channel reservation request message and the channel reservation grant message relate to communications between the first node and the second node.

In another embodiment an apparatus includes preparing means for preparing a frame including at least one channel reservation request message and no channel reservation grant messages or no channel reservation request messages and at least one channel reservation grant message. The method also includes transmitting means for transmitting the frame from a first node to a second node. The channel reservation request message and the channel reservation grant message relate to communications between the first node and the second node.

In further embodiments, a method includes receiving a frame from a first node at a second node, the frame comprising at least one channel reservation request message and at least one channel reservation grant message. The method also includes demultiplexing the at least one channel reservation request message and the at least one channel reservation grant message at least by frequency-division demultiplexing, wherein the channel reservation request message and the channel reservation grant message relate to communications between the first node and the second node.

In additional embodiments, a method includes receiving a frame from a first node to a second node, the frame comprising at least one channel reservation request message and no channel reservation grant messages or no channel reservation request messages and at least one channel reservation grant message. The method also includes processing the received frame to extract the at least one channel reservation request message or the at least one channel reservation grant message. The channel reservation request message and the channel reservation grant message relate to communications between the first node and the second node.

The present invention, in other embodiments, is an apparatus including at least one memory including computer program code and at least one processor. The at least one memory and computer program code are configured to, with the at least one processor, cause the apparatus at least to process a received frame from a first node at a second node. The frame includes at least one channel reservation request message and at least one channel reservation grant message. The at least one memory and computer program code are also configured to, with the at least one processor, cause the apparatus at least to demultiplex the at least one channel reservation request message and the at least one channel reservation grant message at least by frequency-division demultiplexing. The channel reservation request message and the channel reservation grant message relate to communications between the first node and the second node.

In certain further embodiments, the present invention is an apparatus. The apparatus includes at least one memory including computer program code and at least one processor. The at least one memory and computer program code are configured to, with the at least one processor, cause the apparatus at least to process a received frame from a first node at a second node, the frame comprising at least one channel reservation request message and no channel reservation grant messages or no channel reservation request messages and at least one channel reservation grant message. The at least one memory and computer program code are also configured to, with the at least one processor, cause the apparatus at least to extract the at least one channel reservation request message or the at least one channel reservation grant message. The channel reservation request message and the channel reservation grant message relate to communications between the first node and the second node.

In certain further embodiments a non-transitory computer-readable medium is encoded with instructions that, when executed in hardware perform one of the above-described methods.

In additional embodiments, a computer program product may include a computer-readable medium bearing computer program code embodied therein for use with a computer. The computer program code may include code for preparing a frame comprising at least one channel reservation request message and at least one channel reservation grant message, wherein the preparing comprises multiplexing the at least one channel reservation request message and the at least one channel reservation grant message at least by frequency-division multiplexing. The computer program code may also include code for transmitting the frame from a first node to a second node, wherein the channel reservation request message and the channel reservation grant message relate to communications between the first node and the second node.

The present invention may also be, in other embodiments, a computer program product comprising a computer-readable medium bearing computer program code embodied therein for use with a computer. The computer program code may include code for receiving a frame from a first node at a second node, the frame comprising at least one channel reservation request message and at least one channel reservation grant message. The computer program code may also include code for demultiplexing the at least one channel reservation request message and the at least one channel reservation grant message at least by frequency-division demultiplexing, wherein the channel reservation request message and the channel reservation grant message relate to communications between the first node and the second node.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
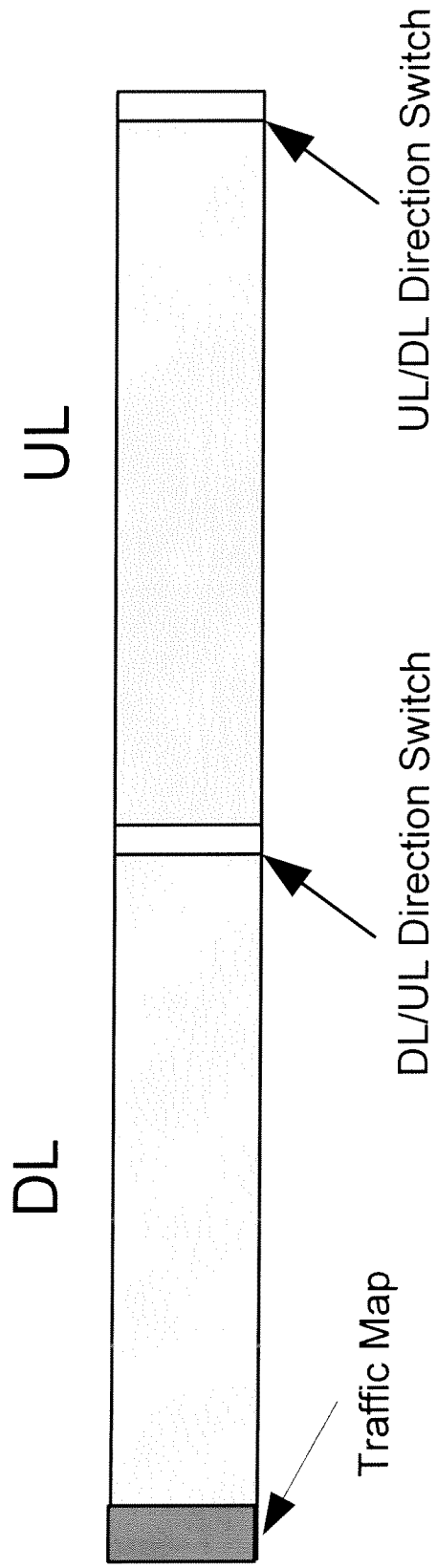
FIG. 1 illustrates reference frame structures for scheduled access.

The use of channel reservation request and grant messages, such as request-to-send (RTS)/clear-to-send (CTS) messages, may benefit from the efficient allocation of RTS and CTS control channels in a frame structure, such that overhead due to uplink (UL)/downlink (DL) switching is minimized.

Certain embodiments of the present invention relate more particularly to orthogonal frequency-division multiple access (OFDMA). Thus, in certain embodiments, RTS and CTS messages are multiplexed in frequency as well as in time. The separation of RTS and CTS in OFDMA frequency resources may permit further compression and may also permit the combination of several RTS and CTS messages in the same resources. For example, an access point, such as an enhanced Node B (eNB), that is processing several CTS responses and RTS requests may multiplex all the messages in the same channel, using OFDMA to separate the messages.

Accordingly, in certain embodiments, a system is a local area radio system that complements a cellular wide area system, such as global system for mobile communications (GSM), universal mobile telecommunications system (UMTS), highs speed packet access (HSPA), and long term evolution (LTE) of the third generation partnership project (3GPP). Unlike wide area cellular systems, a local area system may utilize license-exempt spectrum or white spaces, thereby taking advantage of the additional available bandwidth. In addition a local area system may offer an efficient device-to-device operation mode to establish ad-hoc networks.

The radio interface of a local area evolution (LAE) system may have some similarities to the radio system of 3GPP LTE-Advanced (LTE-A). However, in LAE systems there may be important differences from LTE-A. In particular, LAE system may take account that uncoordinated deployments and dynamic time division duplex (TDD) switching points may be used.

An approach to reduce interference experienced by receivers is given by multiple access systems based on channel reservation, in typical wireless local area network (WLAN) systems. For a system based on a frame structure, such as LAE, this may be realized by means of request to send (RTS)-clear-to-send (CTS) handshake. In an RTS-CTS handshake, following an RTS message, a terminal responds with a CTS message. This procedure aims to ensure that all transmissions are essentially interference-free, which is particularly beneficial for terminals at the edge of a cell.

For efficient utilization of resources, the RTS and CTS control channels may be carefully arranged in the frame structure. If the RTS and CTS control channels are not carefully arranged in the frame structure, the potential gains from lower interference may be overshadowed by the increased overhead due to UL/DL switching times.

In some WLAN standards, RTS/CTS protocol is an optional feature for trying to solve the hidden node problem. The "hidden node problem" is a term for the practical reality that in some wireless networks the access point, hub, or base station may communicate with two nodes that cannot communicate with one another. Indeed, because of the physical realities of the network, a first mobile node may be unable to receive any communications from a second mobile node and vice versa. This situation is viewed as the mobile nodes being hidden from one another, although there is no requirement that any intentional hiding take place. The existence of hidden nodes may complicate media access control. For example, carrier sense multiple access with collision avoidance (CSMA/CA) may not work in such circumstances, because a mobile node may not realize that its packets are colliding with those of the hidden node.

There may be, accordingly, shortcomings with the application of RTS/CTS in conjunction with the CSMA protocol, resulting in an overall rate degradation in the system. However, cell-edge users have the advantage of an essentially interference-free channel, leading to small outage probability. This property makes an RTS/CTS scheme useful for a multi-cell environment that has a quality of service (QoS) target in which a minimum guaranteed data rate should be supported. For efficient utilization of resources, the RTS and CTS control channels may be carefully arranged in the frame structure in order to minimize the signaling overhead and leverage the benefits of a synchronized frame structure for RTS-CTS operation.

Certain embodiments of the present invention provide a method and system that utilize an arrangement of RTS and CTS messages in a frame structure such that overall signaling overhead is minimized.

FIG. 1 shows an example frame structure to be considered as a reference frame structure. In the following discussion, the system utilizes time-division duplex (TDD) and orthogonal frequency-division multiple access (OFDMA) in the physical layer. However, these aspects are for purposes of illustration. The uplink (UL)/downlink (DL) switching times may take into account the time required for a certain device to switch between transmission and reception mode. All nodes may be synchronized at the cyclic prefix (CP) level.

Figure 2:
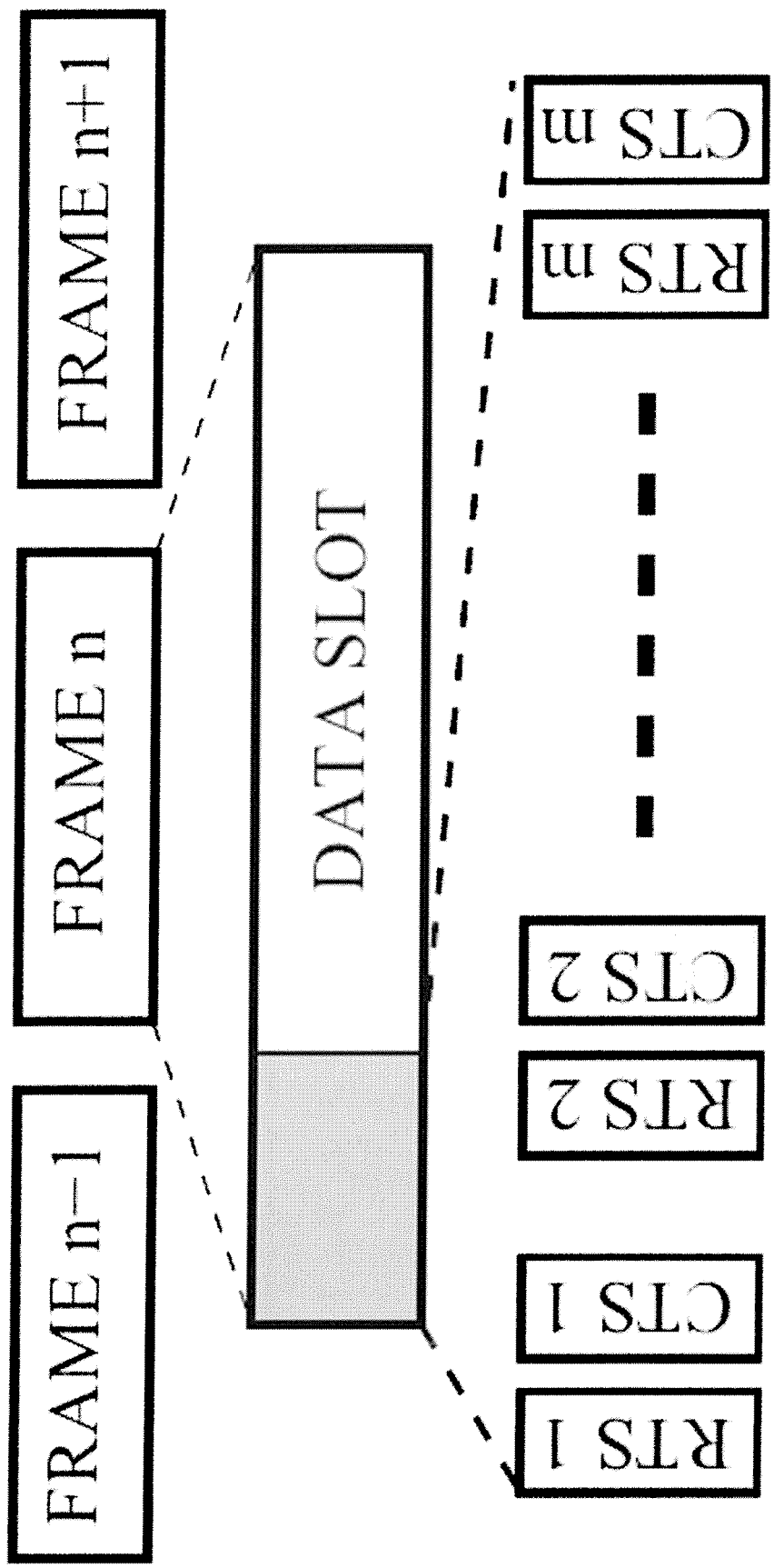
FIG. 2 illustrates references frame structures for request-to-send (RTS)-clear-to-send (CTS) based access.

FIG. 2 shows a reference implementation of a frame structure supporting RTS-CTS handshake. Compared to the frame structure in FIG. 1, the number of direction switches is increased by a factor of three, which together with the RTS-CTS messages themselves may generate additional overhead. One reason for the overhead is the fact that each of the switches involves a time period during which a device is switching transceiver modes from either transmit to receive or receive to transmit. This time cannot conventionally be used either for transmission or reception. Likewise, the RTS-CTS messages, which may serve a valuable administrative purpose, do not actually communicate the payload information.

Accordingly, certain embodiments of the present invention employ an arrangement of RTS-CTS messages that may reduce the number TDD switching points and the amount of control channel overhead compared with, for example, the reference implementation of FIG. 2. One technique that certain embodiments use is to compress RTS-CTS messages. In particular, certain embodiments utilize simultaneous transmission of new RTS requests with the CTS response to a received pending RTS request. Another technique that certain embodiments of the present invention employ is multiplexing RTS and CTS messages in a frequency domain or in both a time domain and frequency domain. A further technique that is used in certain embodiments of the present invention is the combination of several RTS and CTS messages in the same resources.

Another technique is to put receiving UL RTS and/or DL CTS adjacent to the UL frame, and to put transmitting DL RTS and UL CTS adjacent to the DL frame. The DL RTS may be the new RTS providing a request by a first node to a second node for downlink resources or reservations. UL CTS may be the CTS response to a previously received pending RTS request. The received pending RTS request may be sent from the second node to the first node to request uplink reservation. Thus, it should be understood, for example, that the UL RTS and the DL CTS in the same frame are referring to two different channel reservations. Several examples of RTS-CTS arrangement in a TDD frame structure are provided below.

The term "cell" in the following discussion refers to a set of transmission (Tx)-reception (Rx) nodes that primarily are configured to communicate with each other. Thus, "cell" is not limited to so-called "cellular radio" or traditional mobile telephone networks. The concept includes the traditional cell of cellular communications, as well as an access point (AP) with the clients it serves, potential device-to-device communication pairs, clusters in ad-hoc networks, and the like.

Several implementations of the RTS-CTS allocations for different trade-offs between control overhead, delay, and flexibility in TDD switching point are possible, as discussed below.

Figure 3:
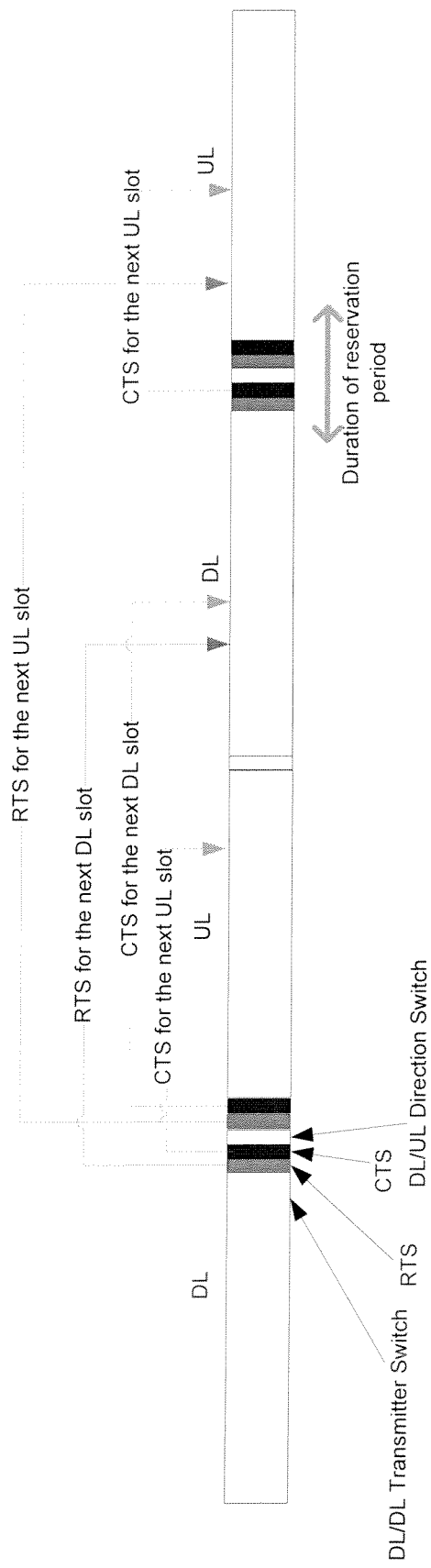
FIG. 3 illustrates an arrangement for RTS-CTS with a small number of direction switches and a short downlink (DL) allocation delay.

A first example embodiment is one in which there is a minimized amount of direction switching and reservations to both directions. Specifically, FIG. 3 shows an arrangement of RTS-CTS messages minimizing the number of direction switches, while keeping DL allocation delay short. The number of direction switches is the same as in the reference frame structure for scheduled access of FIG. 1.

In this scheme there may be no extra direction switches compared to reference frame structure for scheduled access are required. Additionally, there may be a short time between RTS and data transmission in DL. There may, however, be a long time between RTS and data transmission in UL, and the CTS response in UL comes quite late, such that there is only a short time to prepare a new request and to prepare the transmission itself. Furthermore, the scheme illustrated in FIG. 3 may require the DL-to-UL border to be synchronized among other access points (APs).

Figure 4:
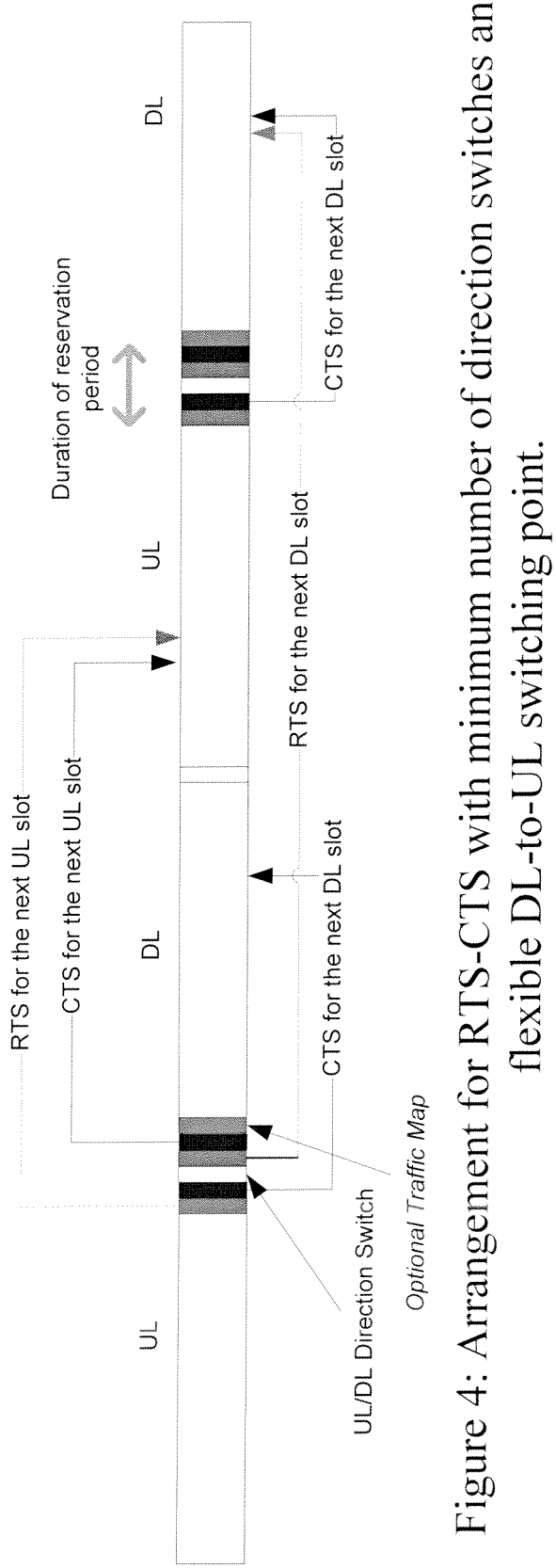
FIG. 4 illustrates an arrangement for RTS-CTS with a small number of direction switches and a flexible DL-to-uplink (UL) switching point.

Another example embodiment is one in which there is minimized direction switching, reservations to both directions, and flexible DL/UL switching. The scheme illustrated in FIG. 3 may be viewed as strict with respect to the switching point between DL and UL sub-frames, such that utilization of RTS-CTS mechanism to coordinate interference between cells is effective. As an alternative to the scheme of FIG. 3, FIG. 4 shows a scheme in which the reservation period is located at the border between UL and DL sub-frames, thus relaxing constraints on the DL-to-UL switching point relative to the embodiment shown in FIG. 3. The tradeoff for this flexibility is increased delays in both directions, in particular for DL allocations. The optional traffic map in FIG. 4 may contain more detailed information on the allocations. For example, the optional traffic map may indicate modulation and coding scheme (MCS) to be used, antenna weights, number of parallel streams, and the like. This information may be transmitted in the CTS message itself, and hence the traffic map may be considered simply a logical representation and not necessarily a separate channel from the CTS.

The scheme of FIG. 4 has no extra direction switches compared to reference frame structure for scheduled access. Additionally, this scheme has no constraint on the DL-to-UL switching point. There is also, in this scheme, a short time between RTS and data transmission in UL and a reasonable time between CTS response and data transmission in UL. Additionally, there may be a long time between RTS and data transmission in DL and the CTS response in DL comes quite late, which implies that there is only a short time to prepare a new request and to prepare the transmission itself.

Figure 5:
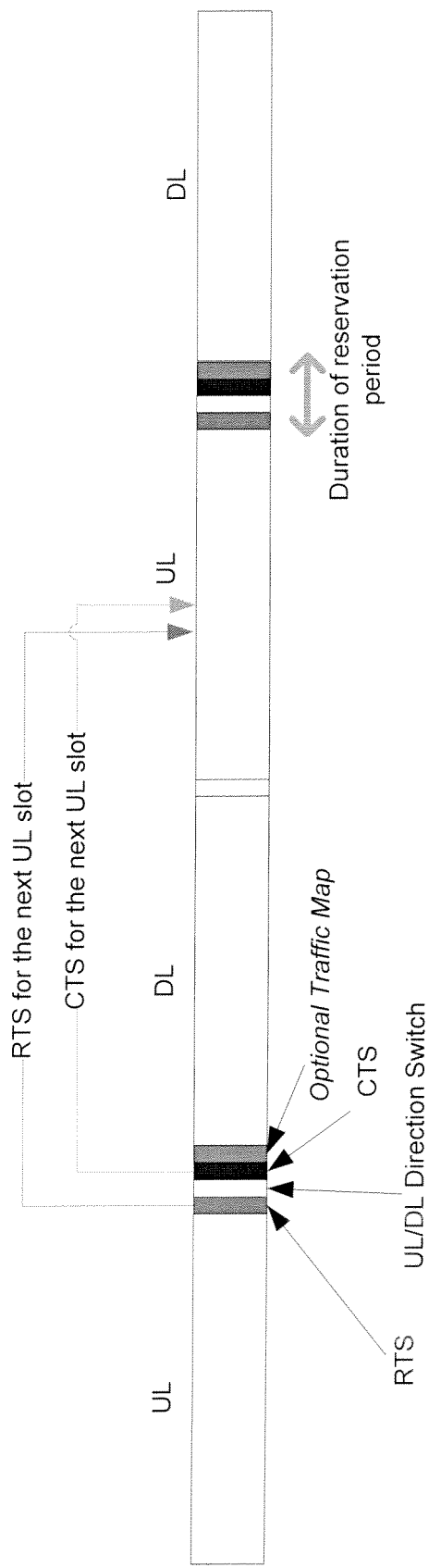
FIG. 5 illustrates an arrangement for RTS-CTS with a small number of direction switches and reservations in UL only.

A further embodiment has minimized direction switching with UL reservations only. If channel reservation mechanism is desired in the UL direction only, the arrangement illustrated in FIG. 5 may be a suitable candidate. It is compatible with a flexible TDD switching point.

Such a scheme has no extra direction switches compared to reference frame structure for scheduled access and places no constraints on the DL-to-UL switching point. Additionally, there is only a short time between RTS and data transmission in the UL, while there is a reasonable amount of time between CTS response and data transmission in the UL. There are, however, no reservations in the DL direction, and consequently this scheme cannot, without further modification, be used to coordinate DL transmissions between APs.

An additional embodiment may provide for minimum allocation delay. When allocation delay is seen as more important than overhead due to UL/DL direction switching times, the schemes shown in FIG. 6 may be used for short allocations where all allocation delays are smaller than one frame.

Figure 6:
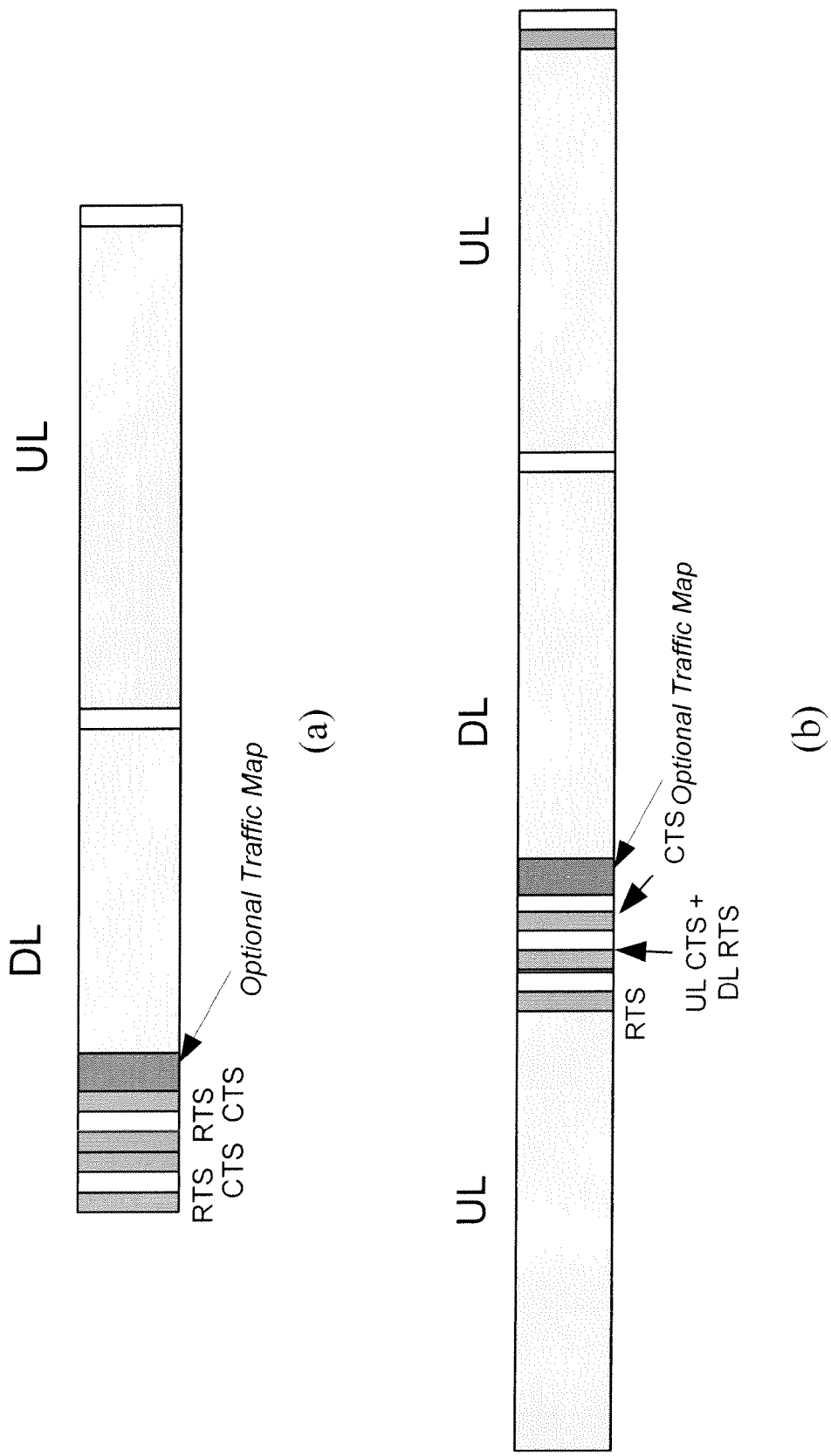
FIG. 6 illustrates an arrangement for RTS-CTS with a small amount of allocation delay.

The embodiment illustrated in FIG. 6 features no constraints on DL-to-UL switching point, a short time between RTS and data transmission in both UL and DL, and a reasonable time between CTS response and data transmission in UL. However, the embodiment of FIG. 6 also includes two extra switches compared to the reference frame structure for scheduled access.

Another embodiment of the present invention may use a scheme in which there are a maximum number of measurement opportunities. When the TDD switching point is not fixed within the network, it may be useful to have reservations done every time there is a change in transmission direction in at least one of the neighboring cells. The lack of fixed TDD switching point implies that it may be useful for RTS messages to be transmitted for every time slot where a direction change would be possible. This is illustrated in FIG. 7.

Figure 7:
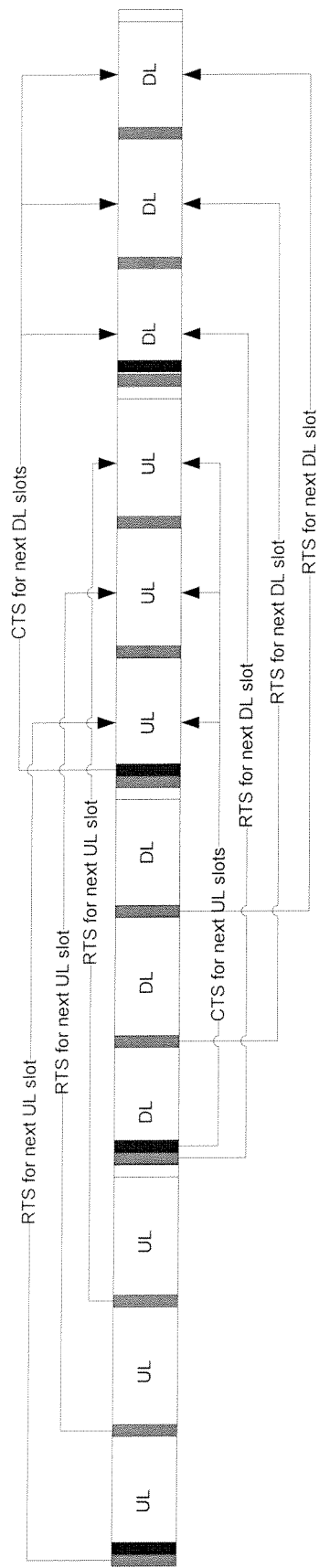
FIG. 7 illustrates an arrangement for RTS-CTS with measurement opportunities in every possible direction change.

One should note that, in principle, CTS responses may be aggregated and transmitted in the areas marked in FIG. 7. However, for optimum interference management capability, an arrangement similar to the reference frame in FIG. 2 may be utilized, with RTS-CTS messages transmitted in every possible direction change.

Figure 8:
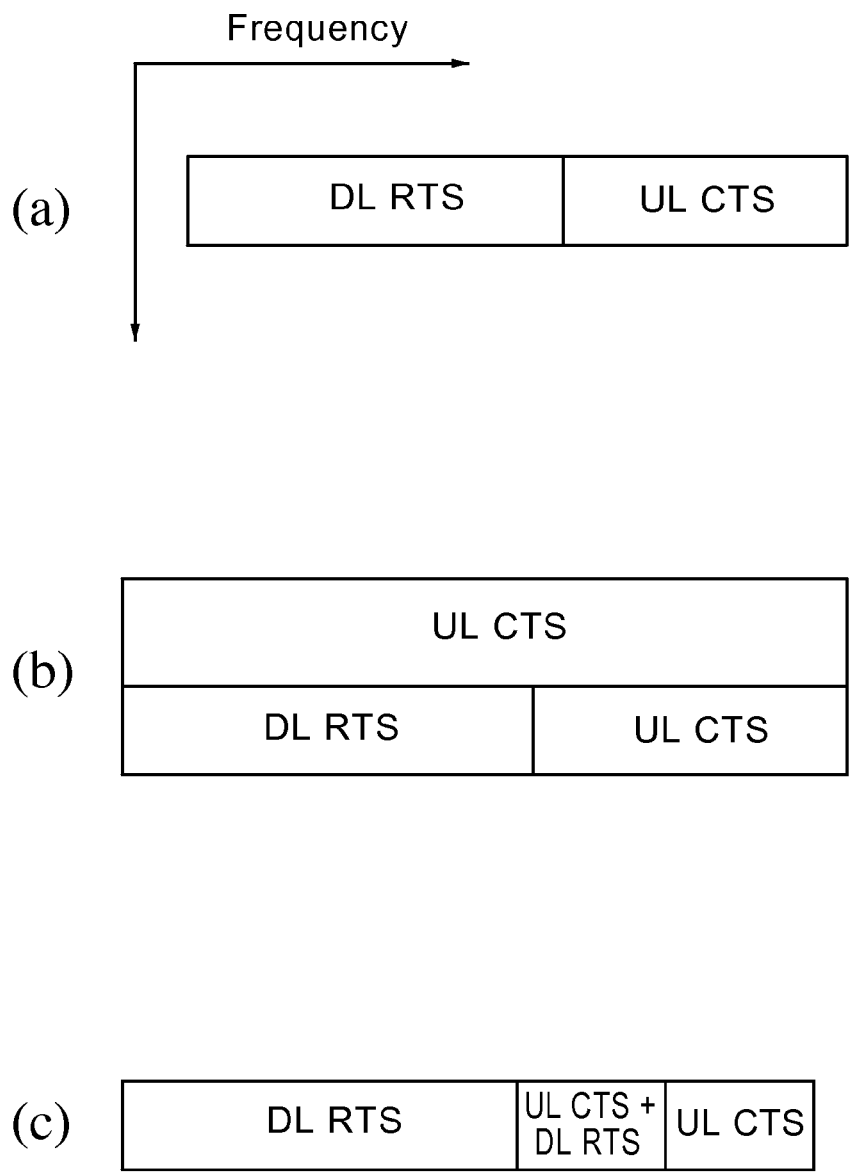
FIG. 8 illustrates compression techniques for RTS-CTS messages.

In another aspect, certain embodiments of the present invention employ compression of RTS-CTS messages. Specifically, when RTS and CTS messages are transmitted by the same node, it is possible to compress the messages to further save control overhead. Thus, there are alternative ways in which RTS and CTS may be sent. For example, a node may send RTS, CTS or combination of RTS+CTS message at one reservation opportunity. Examples of compression possibilities are in DL RTS and UL CTS messages, since they are transmitted by the same AP. Some of these possibilities are illustrated in FIG. 8. Note that the total number of resources to be used for RTS and CTS messages is variable and may depend, for example, on the number of requests per frame.

Multiplexing in frequency as in FIG. 8(a) may avoid unutilized portions of the symbols containing RTS and CTS messages. The arrangement in FIG. 8(b) may be useful when CTS messages are more detailed, such as when they include channel quality information (CQI). The arrangement in FIG. 8(c) is suitable for situations where there are devices with traffic in both directions, while some others have only UL or DL traffic.

Specifically, FIG. 8(a) illustrates multiplexing DL RTS and UL CTS in frequency. FIG. 8(b) illustrates multiplexing DL RTS and UL CTS in frequency and time, with room for detailed CTS responses. FIG. 8(c) illustrates combined CTS and RTS. These schemes may be useful for devices that have traffic in both directions. It should be noted that combining responses in UL direction are possible as well, for example for devices with traffic in both directions, similarly to FIG. 8(c).

The schemes identified above allow for a trade-off between signaling overhead due to UL/DL switching times, allocation delays, and flexibility in TDD switching point.

Figure 9:
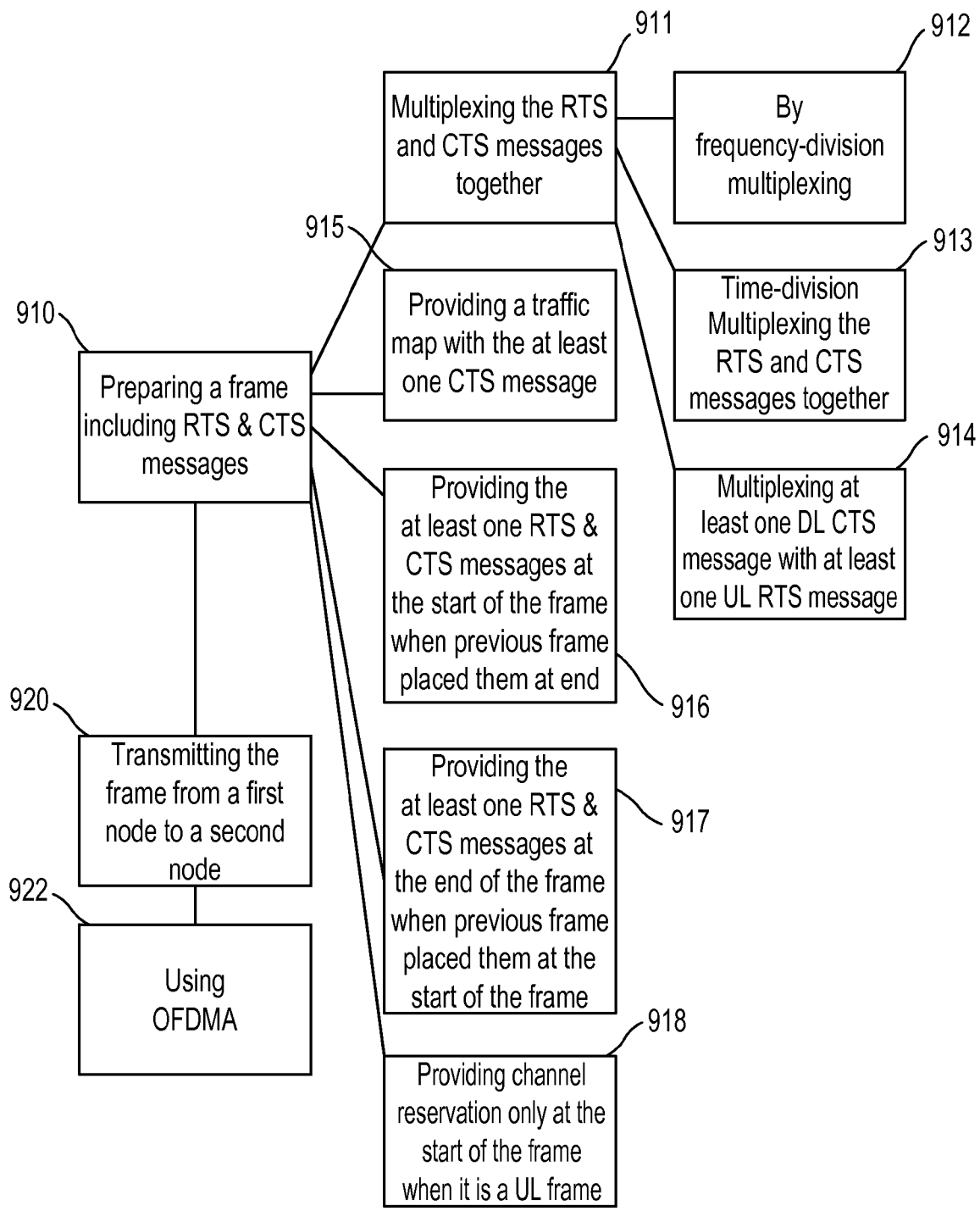
FIG. 9 illustrates a method according to certain embodiments of the present invention.

FIG. 9 illustrates a method according to certain embodiments of the present invention. The method illustrated in FIG. 9 includes preparing 910 a frame including at least one channel reservation request message, such as a request-to-send message, and at least one channel reservation grant message, such as a clear-to-send message. The preparing 910 includes multiplexing 911 together the at least one request-to-send message and the at least one clear-to-send message at least by frequency-division multiplexing 912. The method also includes transmitting 920 the frame from a first node to a second node, wherein the request-to-send message and the clear-to-send message relate to communications between the first node and the second node.

The multiplexing 911 together the at least one request-to-send message and the at least one clear-to-send message may further include time-division multiplexing 913 together the at least one request-to-send message and the at least one clear-to-send message.

The multiplexing 911 may include multiplexing 914 at least one downlink clear-to-send message together with at least one uplink request-to-send message. The preparing 910 the frame may include providing 915 a traffic map with the at least one clear-to-send message.

The frame may be prepared with respect to a second frame. For example, the when an immediately previous frame ended with channel reservation information, the method may include providing 916 the at least one request-to-send message and the at least one clear-to-send message at the start of the frame and when an immediately previous frame began with channel reservation information, the method may include providing 917 the at least one request-to-send message and the at least one clear-to-send message at the end of the frame.

In one example, the present frame may be an uplink frame, whereas the previous frame was a downlink frame. The preparing the frame may include providing 918 channel reservation only at the start of the frame when the frame is an uplink frame.

The transmitting 920 the frame may be performed using 922 orthogonal frequency division multiple access.

Figure 10:
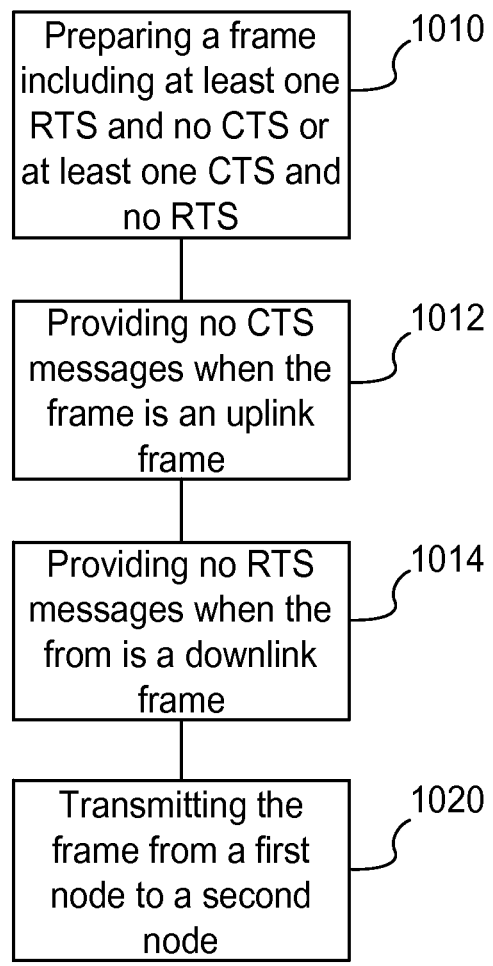
FIG. 10 illustrates another method according to certain embodiments of the present invention.

FIG. 10 illustrates another method according to certain embodiments of the present invention. As illustrated in FIG. 10, the method may include preparing 1010 a frame including at least one channel reservation request message, such as a request-to-send message, and no channel reservation grant messages, such as clear-to-send messages or no channel reservation request messages, such as request-to-send messages, and at least one channel reservation grant message, such as a clear-to-send message. The method may also include transmitting 1020 the frame from a first node to a second node. The request-to-send message and the clear-to-send message relate to communications between the first node and the second node.

The preparing 1010 may include providing 1012 no clear-to-send messages when the frame is an uplink frame and the preparing 1010 may include providing 1014 no request-to-send messages when the frame is a downlink frame. Thus, in such embodiments, the RTS/CTS signaling is used only for uplink (UL) reservations.

Figure 11:
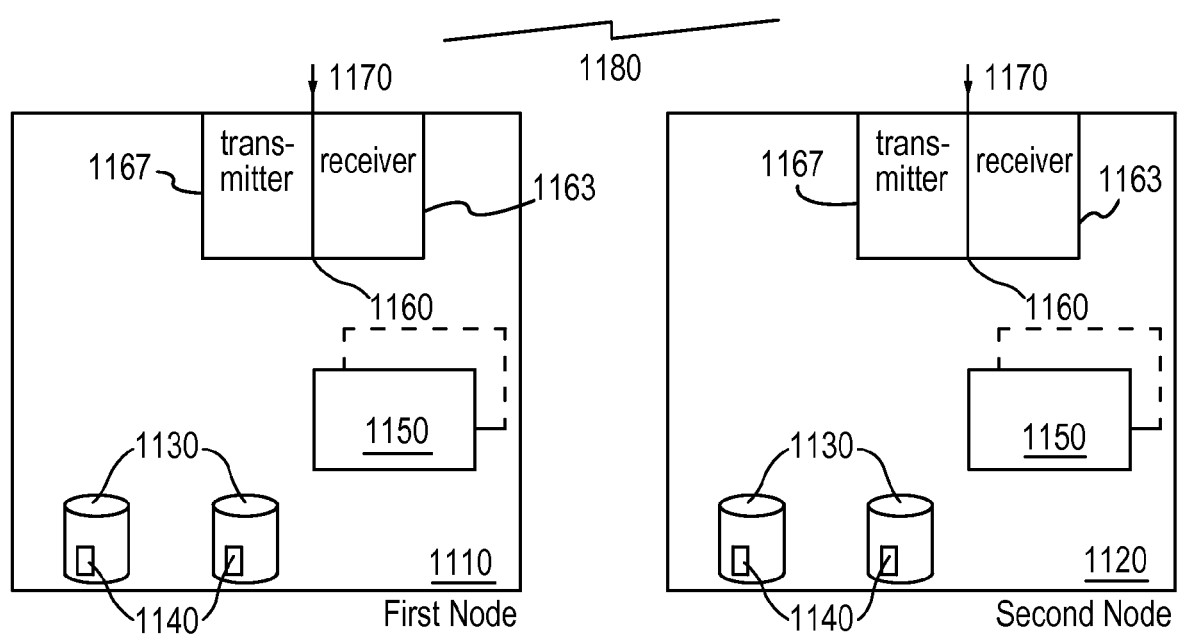
FIG. 11 illustrates a system according to certain embodiments of the present invention.

FIG. 11 illustrates a system according to certain embodiments of the present invention. The system may include two apparatuses, namely a first node 1110 and a second node 1120. The first node 1110 may be, for example, a mobile node, user equipment, or terminal device. The second node 1120 may be an access point, base station, or evolved node B. Alternatively, the first node 1110 and the second node 1120 each be device-to-device capable nodes, such as user equipment.

The first node 1110 and the second node 1120 may each include at least one memory 1130 and computer program code 1140. The first node 1110 and the second node 1120 may also each include at least one processor 1150. The at memory 1130 and computer program code 1140 may be configured, together with the processor 1150, to cause the first node 1110 or second node 1120 to perform a method, such as the methods illustrated in FIGS. 9 and 10 or the methods illustrated in FIGS. 12 and 13, below.

The memory 1130 may be any suitable storage device. For example, the memory 1130 may be a hard drive, random access memory (RAM), or read-only memory (ROM). The computer program code 1140 may be, for example, computer instructions in the form of a compiled or interpreted programming language. The processor 1150 may be any suitable processing device. For example, the processor 1150 may be a controller, a central processing unit (CPU) or an application specific integrated circuit (ASIC). The processor 1150 and the memory 1130 may be implemented on a single chip or on separate chips.

The first node 1110 and the second node 1120 may further each include a transceiver 1160 including a receiver 1163 and a transmitter 1167. The transceiver 1160 may be configured to communicate over a wireless communication link 1180 using at least one antenna 1170.

Figure 12:
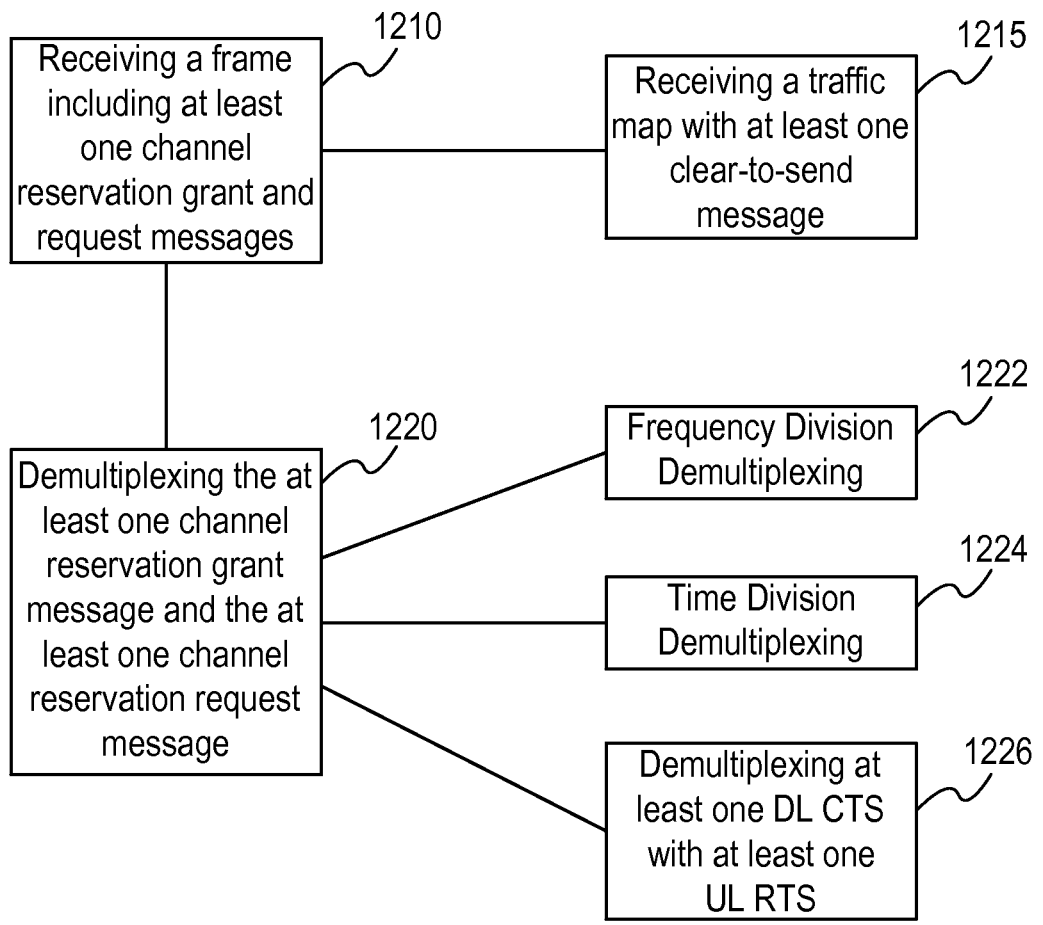
FIG. 12 illustrates a method according to certain embodiments of the present invention.

FIG. 12 illustrates a method according to certain embodiments of the present invention. The method of FIG. 12 includes receiving 1210 a frame from a first node at a second node, the frame including at least one channel reservation request message and at least one channel reservation grant message. The method of FIG. 12 also includes demultiplexing 1220 the at least one channel reservation request message and the at least one channel reservation grant message at least by frequency-division demultiplexing 1222, wherein the channel reservation request message and the channel reservation grant message relate to communications between the first node and the second node. The at least one channel reservation request message may include a request-to-send message and the at least one channel reservation grant message includes a clear-to-send (CTS) message.

The CTS message may refer to an already-created own reservation, that is to say, a reservation previously requested by the node receiving the CTS. In contrast, the RTS message may be a request to provide a reservation to the other device.

The demultiplexing 1220 the at least one request-to-send message and the at least one clear-to-send message may further include time-division demultiplexing 1224 the at least one request-to-send message and the at least one clear-to-send message. The demultiplexing 1220 the at least one request-to-send message and the at least one clear-to-send message may include demultiplexing 1226 at least one downlink clear-to-send message with at least one uplink request-to-send message. The receiving 1210 the frame further includes receiving 1215 a traffic map with the at least one clear-to-send message.

Figure 13:
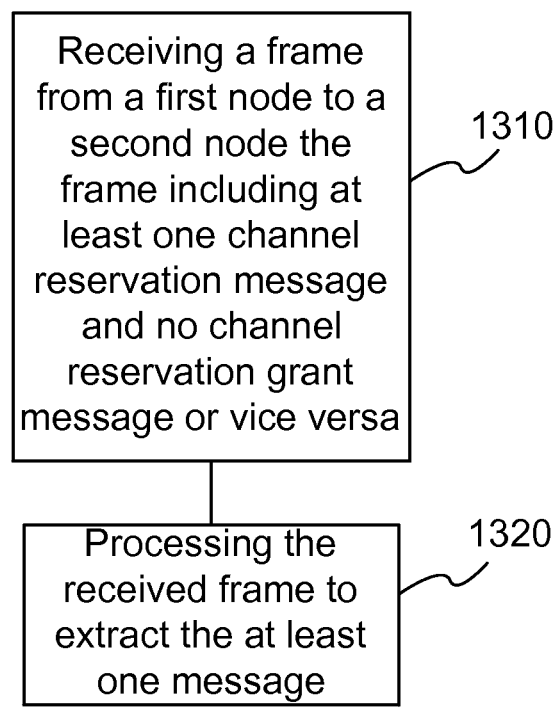
FIG. 13 illustrates a method according to further embodiments of the present invention.

FIG. 13 illustrates a method according to further embodiments of the present invention. The method includes receiving 1310 a frame from a first node to a second node, the frame including at least one channel reservation request message and no channel reservation grant messages or no channel reservation request messages and at least one channel reservation grant message. The method further includes processing 1320 the received frame to extract the at least one channel reservation request message or the at least one channel reservation grant message. The channel reservation request message and the channel reservation grant message relate to communications between the first node and the second node.

In certain embodiments of the present invention, a computer program product includes a computer-readable medium bearing computer program code embodied therein for use with a computer. The code may include code for performing the various features of the methods discussed above, such as the methods of FIGS. 9-10 and 12-13.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, while the use of RTS and CTS as examples of channel reservation request messages and channel reservation grant messages have been provided, other embodiments are also possible. In order to determine the metes and bounds of the invention, therefore, reference should be made to the appended claims.

We claim:

1. A method, comprising:
    preparing a frame comprising at least one channel reservation request message and at least one channel reservation grant message, wherein the preparing comprises multiplexing the at least one channel reservation request message and the at least one channel reservation grant message at least by frequency-division multiplexing and time division multiplexing;
    when an immediately previous frame ends with channel reservation information, providing the at least one channel reservation request message and the at least one channel reservation grant message at the start of the frame;
    when an immediately previous frame begins with channel reservation information, providing the at least one channel reservation request message and the at least one channel reservation grant message at the end of the frame; and
    transmitting the frame from a first node to a second node, wherein the channel reservation request message and the channel reservation grant message relate to communications between the first node and the second node.

2. The method of claim 1, wherein the preparing the frame comprises preparing a frame wherein the at least one channel reservation request message comprises a request-to-send message and the at least one channel reservation grant message comprises a clear-to-send message.

3. An apparatus, comprising:
at least one memory including computer program code; and
at least one processor,
wherein the at least one memory and computer program code are configured to, with the at least one processor, cause the apparatus at least to
prepare a frame comprising at least one channel reservation request message and at least one channel reservation grant message, wherein the preparation of the frame comprises multiplexing the at least one channel reservation request message and the at least one channel reservation grant message at least by frequency-division multiplexing and time division multiplexing;
when an immediately previous frame ends with channel reservation information, provide the at least one channel reservation request message and the at least one channel reservation grant message at the start of the frame;
when an immediately previous frame begins with channel reservation information, provide the at least one channel reservation request message and the at least one channel reservation grant message at the end of the frame; or
when the frame is an uplink frame, provide channel reservation only at the start of the frame; and
transmit the frame from a first node to a second node, wherein the channel reservation request message and the channel reservation grant message relate to communications between the first node and the second node.

4. The apparatus of claim 3, wherein the at least one memory and computer program code are configured to, with the at least one processor, cause the apparatus at least to prepare a frame wherein the at least one channel reservation request message comprises a request-to-send message and the at least one channel reservation grant message comprises a clear-to-send message.

5. The apparatus of claim 3, wherein the at least one memory and computer program code are also configured to, with the at least one processor, cause the apparatus at least to time-division multiplex the at least one channel reservation request message and at least one channel reservation grant message.

6. The apparatus of claim 3, wherein the at least one memory and computer program code are also configured to, with the at least one processor, cause the apparatus at least to multiplex at least one channel reservation request message with at least one uplink channel reservation grant message.

7. The apparatus of claim 3, wherein the at least one memory and computer program code are configured to, with the at least one processor, cause the apparatus at least to provide a traffic map with the at least one channel reservation grant message.

8. The apparatus of claim 3, wherein the at least one memory and computer program code are configured to, with the at least one processor, cause the apparatus at least to transmit the frame using orthogonal frequency division multiple access.

9. A method, comprising:
receiving a frame from a first node at a second node, the frame comprising at least one channel reservation request message and at least one channel reservation grant message;
when an immediately previous frame ends with channel reservation information, receiving the at least one channel reservation request message and the at least one channel reservation grant message at the start of the frame;
when an immediately previous frame begins with channel reservation information, receiving the at least one channel reservation request message and the at least one channel reservation grant message at the end of the frame; and
demultiplexing the at least one channel reservation request message and the at least one channel reservation grant message at least by frequency-division demultiplexing and time division demultiplexing, wherein the channel reservation request message and the channel reservation grant message relate to communications between the first node and the second node.

10. The method of claim 9, wherein the receiving the frame comprises receiving a frame wherein the at least one channel reservation request message comprises a request-to-send message and the at least one channel reservation grant message comprises a clear-to-send message.

11. An apparatus, comprising:
at least one memory including computer program code; and
at least one processor,
wherein the at least one memory and computer program code are configured to, with the at least one processor, cause the apparatus at least to
process a received frame from a first node at a second node, the frame comprising at least one channel reservation request message and at least one channel reservation grant message;
when an immediately previous frame ends with channel reservation information, receive the at least one channel reservation request message and the at least one channel reservation grant message at the start of the frame;
when an immediately previous frame begins with channel reservation information, receive the at least one channel reservation request message and the at least one channel reservation grant message at the end of the frame; and
demultiplex the at least one channel reservation request message and the at least one channel reservation grant message at least by frequency-division demultiplexing and time division demultiplexing, wherein the channel reservation request message and the channel reservation grant message relate to communications between the first node and the second node.

12. The apparatus of claim 11, wherein the at least one memory and computer program code are configured to, with the at least one processor, cause the apparatus at least to process the received frame wherein the at least one channel reservation request message comprises a request-to-send message and the at least one channel reservation grant message comprises a clear-to-send message.

13. The apparatus of claim 11, wherein the at least one memory and computer program code are also configured to, with the at least one processor, cause the apparatus at least to time-division demultiplex the at least one channel reservation request message and at least one channel reservation grant message.

14. The apparatus of claim 11, wherein the at least one memory and computer program code are also configured to, with the at least one processor, cause the apparatus at least to demultiplex at least one channel reservation request message with at least one channel reservation grant message.

15. A computer program product comprising a non-transitory computer-readable medium bearing computer program code embodied therein for use with a computer, the computer program code comprising:
code for preparing a frame comprising at least one channel reservation request message and at least one channel reservation grant message, wherein the preparing comprises multiplexing the at least one channel reservation request message and the at least one channel reservation grant message at least by frequency-division multiplexing and time division multiplexing;

code for, when an immediately previous frame ends with channel reservation information, providing the at least one channel reservation request message and the at least one channel reservation grant message at the start of the frame;

code for, when an immediately previous frame begins with channel reservation information, providing the at least one channel reservation request message and the at least one channel reservation grant message at the end of the frame; and code for transmitting the frame from a first node to a second node, wherein the channel reservation request message and the channel reservation grant message relate to communications between the first node and the second node.

16. A computer program product comprising a non-transitory computer-readable medium bearing computer program code embodied therein for use with a computer, the computer program code comprising:

code for receiving a frame from a first node at a second node, the frame comprising at least one channel reservation request message and at least one channel reservation grant message;

code for, when an immediately previous frame ends with channel reservation information, receiving the at least one channel reservation request message and the at least one channel reservation grant message at the start of the frame;

code for, when an immediately previous frame begins with channel reservation information, receiving the at least one channel reservation request message and the at least one channel reservation grant message at the end of the frame; and code for demultiplexing the at least one channel reservation request message and the at least one channel reservation grant message at least by frequency-division demultiplexing and time division demultiplexing, wherein the channel reservation request message and the channel reservation grant message relate to communications between the first node and the second node.

\* \* \* \* \*